Figure 1:
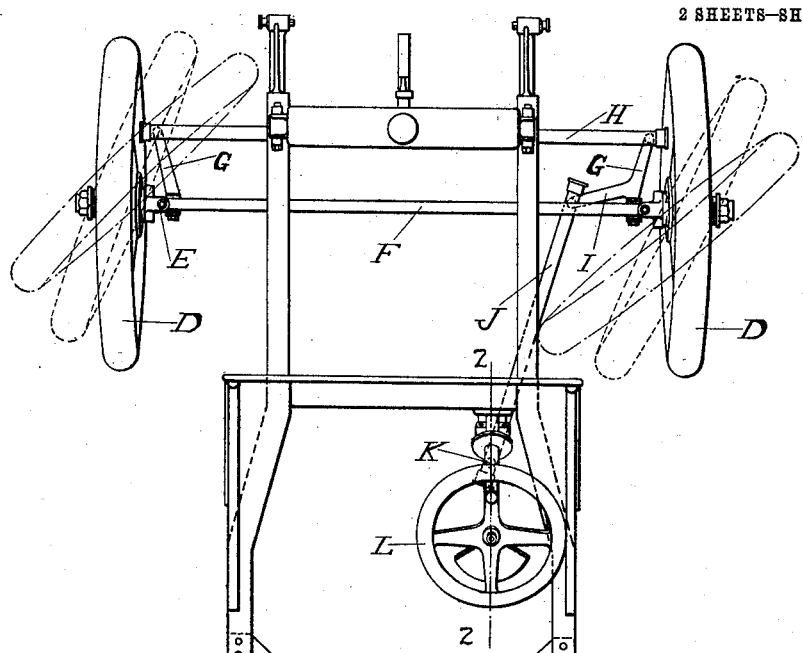
Figure 1:
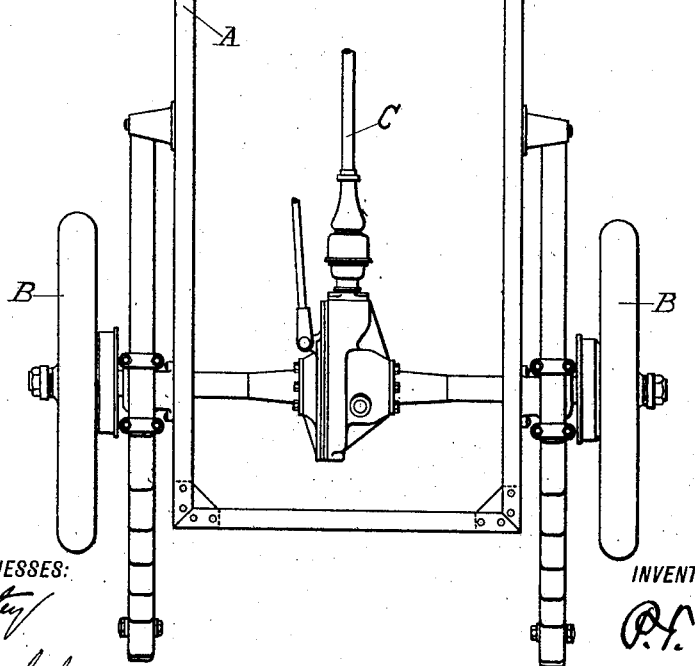

P. T. DODGE.
MOTOR VEHICLE.
APPLICATION FILED SEPT. 25, 1908.

1,057,127.

Patented Mar. 25, 1913.
2 SHEETS—SHEET 1.

WITNESSES:

INVENTOR

P. T. DODGE.
MOTOR VEHICLE.
APPLICATION FILED SEPT. 25, 1908.
1,057,127.
Patented Mar. 25, 1913.
2 SHEETS—SHEET 2.
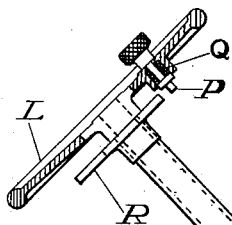
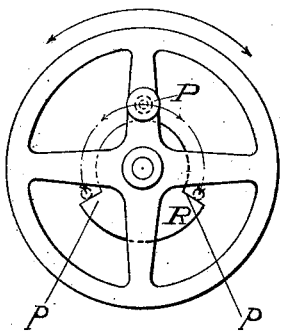
Fig. 3.
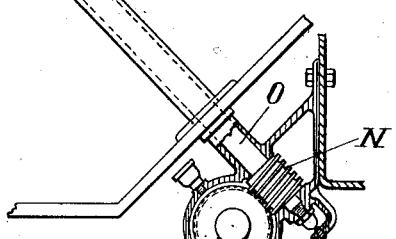
Fig. 2.
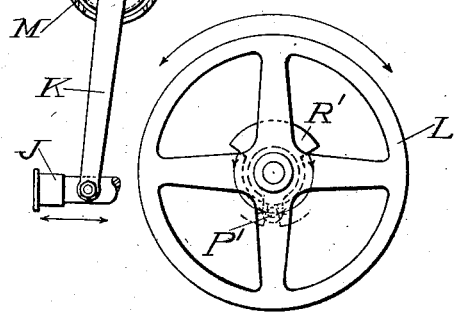
Fig. 5.
Fig. 4.
WITNESSES:
INVENTOR

UNITED STATES PATENT OFFICE.

PHILIP T. DODGE, OF WASHINGTON, DISTRICT OF COLUMBIA.

MOTOR-VEHICLE.

1,057,127. Specification of Letters Patent. Patented Mar. 25, 1913.

Application filed September 25, 1908. Serial No. 454,782.

*To all whom it may concern:*

Be it known that I, PHILIP T. DODGE, a citizen of the United States, residing at Washington, District of Columbia, have invented a new and useful Improvement in Motor-Vehicles, of which the following is a specification.

My invention has reference to vehicles propelled by internal combustion engines, or equivalent motors, and steered by swiveling ground wheels manually controlled.

Practice has shown that the hand wheel or its equivalent used for steering purposes must be left free to turn; and, in fact, it is moved slightly to and fro almost incessantly.

When these vehicles are used in cities, they must be adapted to turn in a very small circle, and to this end it is necessary to turn the steering wheels, which are normally free from locking or detaining devices, to an extreme angle. The vehicles must be adapted to travel at high speeds, and if, while moving at such speeds, the steering wheels are suddenly turned to the extreme position, serious accidents are liable to result. There is danger of the machine "skidding" or failing to turn promptly; of the tires being ruptured or being displaced by transverse strains; and of the vehicle being overturned. Experience has shown that in sudden emergencies drivers, because of fear, nervousness or carelessness, are liable to turn the wheels to extreme and dangerous positions while the machines are traveling at high speed. In fact, vehicles can be turned with safety in small circles only when traveling at a slow speed.

The aim of my invention is to prevent the accidents above-named, and to provide a vehicle which can be turned in a small space when traveling at a slow speed, but the wheels of which, although free to swing within ordinary limits, will be prevented from assuming an extreme angle when it is traveling at high speed. To this end I propose to combine with the manually operated steering gear, normally free to move the wheels in either direction, stop devices which limit the motion of the wheels, but which may be thrown out of action at will to permit a further and extreme movement of the wheels.

I propose to arrange the stop mechanism in such manner that it will require a distinct and intentional effort on the part of the operator to throw it out of action to permit the extreme movement or swiveling of the wheels, and I also propose to arrange it in such manner that when the wheels are brought back within the normal or ordinary limits which may safely be assumed at high speed, the stop devices will be thrown automatically into action.

My invention consists broadly in combining with the free or unlocked steering wheel or steering gear, limiting or controlling devices of any character which will normally limit the swiveling or steering movement of the wheels, and which may be disengaged or adjusted at will to permit the further movement of the wheels.

It will be understood by the skilled mechanic that the stop devices may be made in a great variety of forms applicable to the various steering mechanisms now in use, and that they may be operated by hand or foot.

Referring to the accompanying drawings,—Figure 1 is a top plan view of a chassis provided with my improvement, including a manually controllable stop. Fig. 2 is a vertical section on the line 2—2 of Fig. 1. Fig. 3 is a top plan view of the steering wheel and stop devices shown in the preceding figures. Fig. 4 is a side elevation of a modified form and showing the steering wheel pedal stop devices. Fig. 5 is a top plan view of the parts shown in the preceding figure.

Referring to Fig. 1, A represents the main frame or chassis of the car; B—B the rear ground wheels by which the machine is propelled; C a driving shaft leading from the motor and geared to the ground wheels; D—D are the front supporting and steering wheels mounted on short axles, which are connected by upright pivots E mounted on the stationary axle F. These front axles are each provided with an arm G at the front, and connected by a coupling bar H, by which the wheels are compelled to swing in unison to the right or left.

One of the steering axles is provided with an arm I, connected by a bar J to a crank arm K, which is controlled through intermediate devices by the hand wheel or steering wheel L on the upper end of a supporting post.

In the particular example shown, the crank K is provided with an actuating pinion M engaged as shown in Fig. 2, by a worm N on the lower end of the shaft O which carries the hand wheel, so that as the wheel is turned to the right or left, it acts through the intermediate parts to turn or swivel the steering wheels D—D to the right or left around the axes E.

The steering gear and wheels are without locking or clamping devices of any kind, and at all times free to be turned right or left. This is absolutely necessary in the steering of high speed vehicles.

All of the foregoing parts may be constructed and arranged in the ordinary manner, and so far as described, they constitute no part of my invention.

As heretofore arranged, the wheels D—D and all their connections have been so arranged as to admit of the wheels being turned at all times to the right or left to their extreme positions. It is frequently necessary to turn them to an angle of 45 degrees or thereabout, from the position which they occupy when the car is traveling in a straightforward course. If the wheels assume this position, indicated by the broken lines in Fig. 1, while the car is traveling at high speed, there is danger of a serious accident resulting. I therefore provide means for limiting the swiveling motion of the wheels D—D under ordinary conditions,—means by which the motion may be limited to the position indicated in dotted lines, or even to a position of less angularity, one which may be safely assumed at any speed at which the car could be driven.

In the form shown in Figs. 1, 2 and 3, the stop device consists of a vertical pin P mounted in the steering wheel and urged downward by a spring Q, by which it is held normally in position to engage the outermost portion of a flanged plate R fixed rigidly to the upper end of the steering post. This plate, as shown in Figs. 1, 2 and 3, is provided at opposite sides of the center with shoulders *p*. The wheel is free to turn to the right and left until the pin encounters one of these shoulders. They are so located as to arrest the steering wheels within the safety limit, and they positively prevent the wheels from assuming dangerous positions, if through carelessness, or nervousness, or through the jolting of the car the operator should try to urge the wheel beyond the safety point. They do not, however, interfere in any manner with the free action of the steering devices within safety limits.

When it is required to turn the machine within a small radius, it is only necessary for the operator to lift the pin P until its lower end is clear of the stop plate R, whereupon the wheel may be turned until the wheels assume the extreme obliquity permitted by the steering joints or knuckles. After the wheel is turned beyond the normal position, the pin may be permitted to ride on top of the plate, and when the wheels are brought back within the normal limits by turning the steering wheel, the pin will automatically drop to its original position, so as to again limit the movement of the steering wheels.

Figs. 4 and 5 represent a similar arrangement, except that the stop pin or rod P′, instead of being carried on the wheel, is mounted to slide in bearings on the stationary steering post with its upper end arranged to engage the shouldered plate R′ secured to the under side of the wheel. The stop pin P′ is extended downward in this case and provided at its lower end with a pedal or foot-piece *p*′, by which it may be depressed until its upper end clears the plate R′. It will be lifted and restored to its normal or operative position whenever the steering wheel is brought back within the normal limits.

It is manifest that the stop devices may be made in any suitable form and adapted to engage any part of the mechanism between the hand wheel and the steering wheels, the only requirement being that the latter shall be limited as to their swiveling motion until intentionally released by the operator, so that they may be swiveled to their abnormal or extreme position.

Having described my invention, I claim—

1. In a motor vehicle having swiveled steering wheels and manual connections constantly free for swiveling the wheels to the normal extent, a normally operative means to prevent positively the wheels from being swiveled to their extreme positions, said means adapted to be thrown instantly out of action by the operator at will, that the wheels may be swiveled beyond the normal limits.

2. In a motor vehicle, the combination of swiveled steering wheels, a manually operative and constantly free steering gear for swiveling the wheels right and left, and normally operative positive stop devices to check said swiveling motion within the ordinary limits, said stop devices being adapted to be instantly thrown out of action at will so that the swiveling motion may be continued beyond the ordinary limits.

3. In a motor vehicle, the combination of swiveled steering wheels, constantly free steering gear for swiveling said wheels to the right and left, and positive stop devices to limit the swiveling motion, said stop devices being adapted to be thrown out of action at will to permit a further and abnormal movement of the wheels.

4. In a motor vehicle having swiveled steering wheels and gear for turning the same, a gear operating shaft O, a hand wheel L for turning the same, and positive stop devices coöperating with the wheel to permit a limited rotary motion of the same, said stop devices being adapted to be instantly thrown out of action at will so that the wheel may be turned to a greater extent.

5. In a motor vehicle having swiveled steering wheels and means for operating the same, the combination of a retractable stop device connected to the operating means and an abutment located in the path of the stop device to limit positively the extent of motion of the said operating means, the retraction of the stop device permitting the further movement of the operating means.

In testimony whereof I hereunto set my hand this twenty-second day of September, 1908, in the presence of two attesting witnesses.

PHILIP T. DODGE.

Witnesses:
F. M. EGGLESTON,
WALTER MOBLARD.

Copies of this patent may be obtained for five cents each, by addressing the "Commissioner of Patents, Washington, D. C."